United States Patent [19]

Criswell

[11] Patent Number: 4,528,640

[45] Date of Patent: Jul. 9, 1985

[54] METHOD AND A MEANS FOR CHECKING NORMALIZING OPERATIONS IN A COMPUTER DEVICE

[75] Inventor: Peter B. Criswell, Bethel, Minn.

[73] Assignee: Sperry Corporation, New York, N.Y.

[21] Appl. No.: 397,760

[22] Filed: Jul. 13, 1982

[51] Int. Cl.³ .............................................. G06F 11/00
[52] U.S. Cl. ...................................... 364/737; 364/748
[58] Field of Search ............................... 364/748, 737

[56] References Cited

U.S. PATENT DOCUMENTS

| | | | |
|---|---|---|---|
| 3,551,665 | 12/1970 | Powers et al. | 364/748 |
| 3,831,012 | 8/1974 | Tate et al. | 364/748 |
| 3,871,578 | 3/1975 | Van de Goor et al. | 364/748 |
| 4,366,548 | 12/1982 | Kregness et al. | 364/748 |

Primary Examiner—David H. Malzahn
Attorney, Agent, or Firm—Charles A. Johnson; Kenneth T. Grace; Marshall M. Truex

[57] ABSTRACT

A method and a means are disclosed for the through-checking of the normalizer operations of an arithmetic unit of a data processing system involving both integer and floating-point formats in single and double precision operations. A post normalizer is used in conjunction with the main normalizer of the arithmetic unit to determine if the result is indeed normalized. Where the post normalize count is zero, an error designator remains inactivated. However, where the count is non-zero, the error designator is activated to indicate an error exists, unless it is disabled by separate circuitry which detects that the number being shifted is $\pm 0$. The preferred embodiment disclosed herein checks the operation of a pair of 72-bit main normalizers with a single 13-bit post normalizer. A plurality of instructions in which this check is significant are illustrated.

13 Claims, 13 Drawing Figures

UNPACKED CHARACTERISTICS KEPT IN MAGNITUDE FORM.
PACKED CHARACTERISTIC COMPLEMENTED FOR NEGATIVE MANTISSAS.
CHARACTERISTICS ARE BIASED IN THEIR MOST SIGNIFICANT BIT POSITIONS.

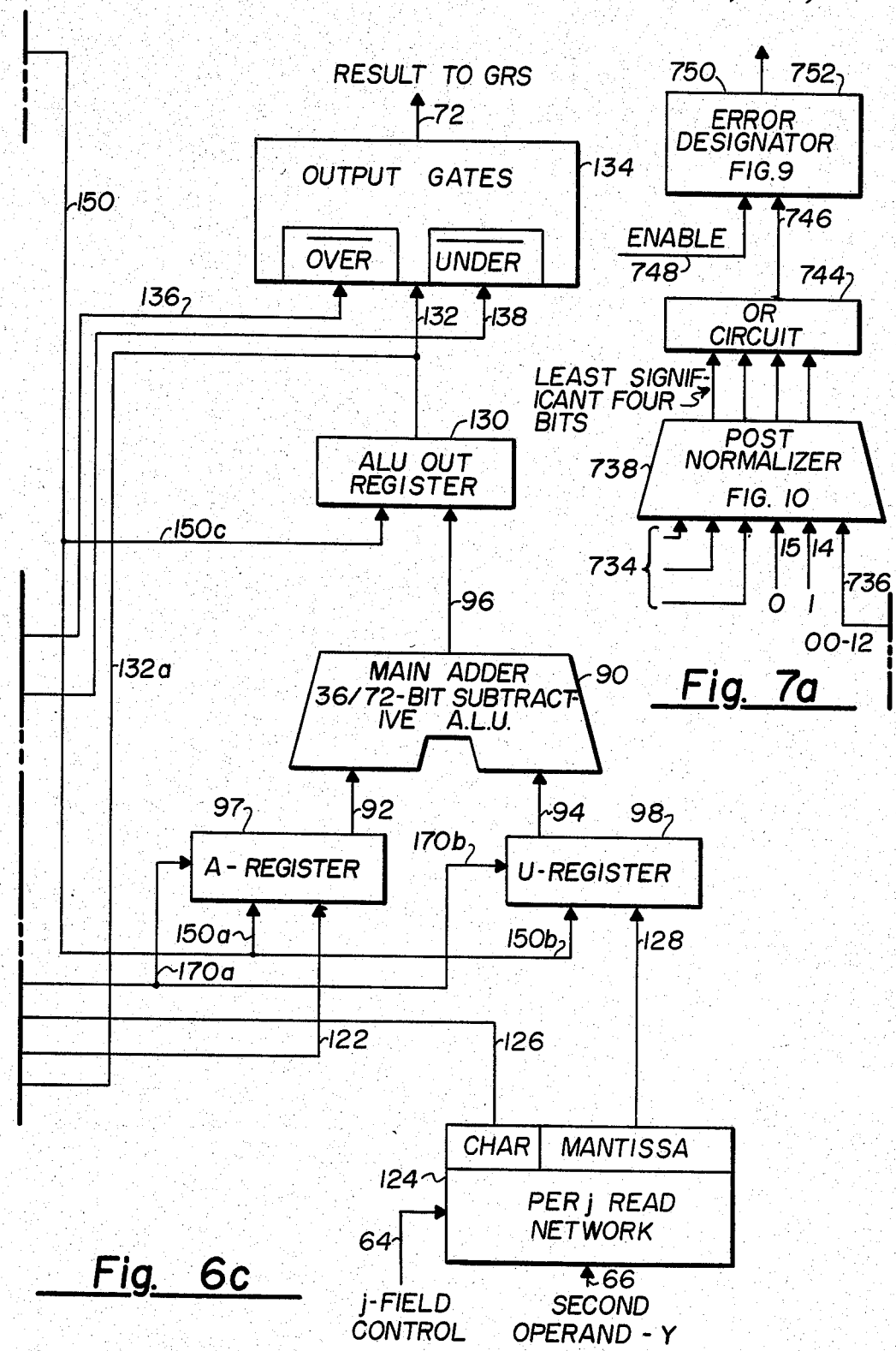

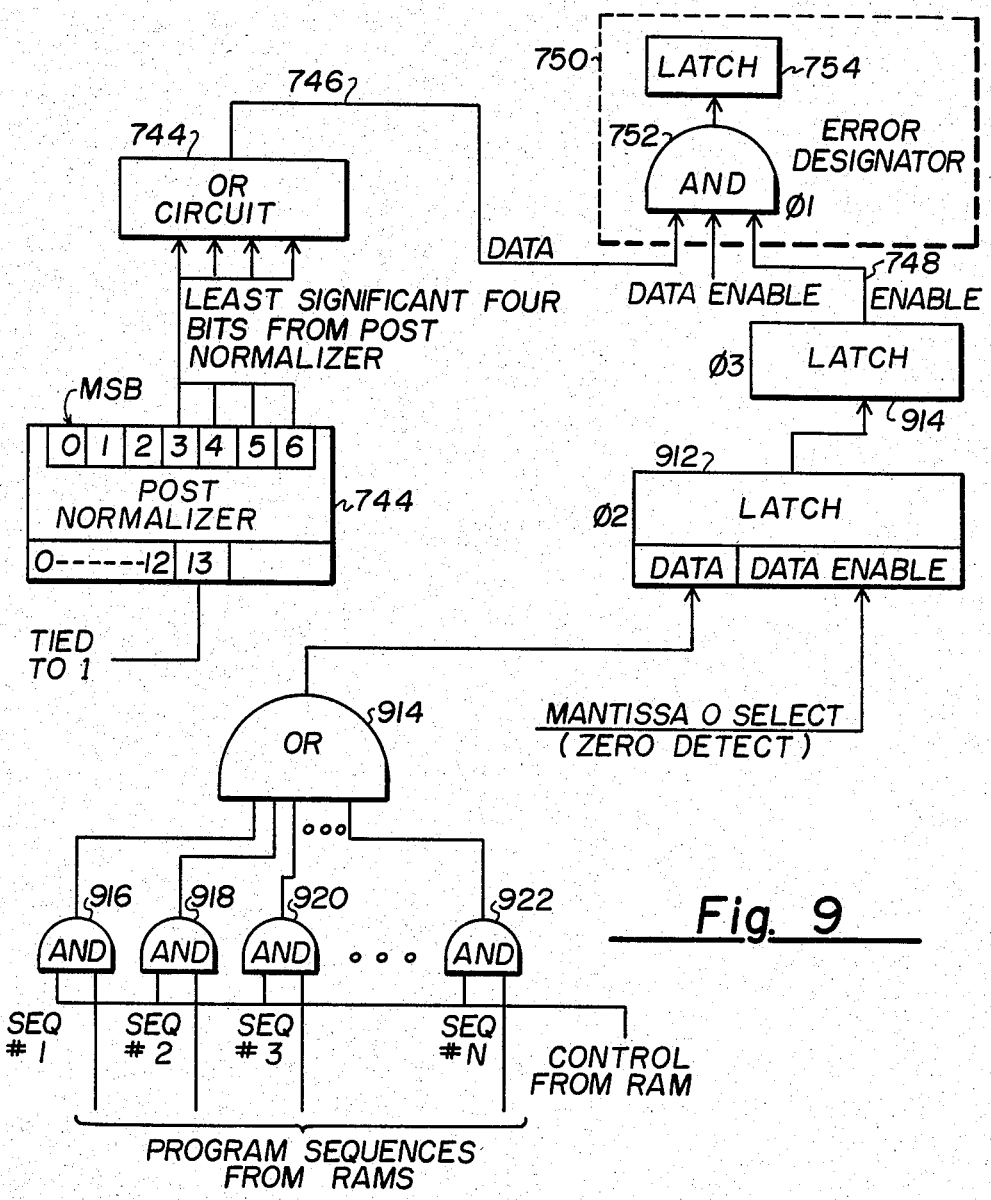

METHOD AND A MEANS FOR CHECKING NORMALIZING OPERATIONS IN A COMPUTER DEVICE

BACKGROUND OF THE INVENTION

A. Field of the Invention

This invention relates to data processing systems which include computing devices, and more particularly to an improved method and means for checking the normalizing operations in the arithmetic units of said computing devices.

B. Prior Art

A related application also assigned to the present assignee, is U.S. Ser. No. 221,981, filed Dec. 28, 1982, now U.S. Pat. No. 4,366,548, and entitled "Adder for Exponent Arithmetic" by Glen R. Kregness and Peter B. Criswell. Mr. Criswell is the sole inventor of the present device. Portions of that application have been included herein to provide the common background environment and explanatory description for the present invention.

In computing devices employing floating-point arithmetic capability, the data or operands upon which arithmetic functions are to be performed are in a format such that one portion of the data word contains the actual information and is called the mantissa. A second portion of the data words contains the signals indicative of the relative position of the arithmetic point, such as decimal or binary point, of the information contained in the mantissa, and is referred to as the characteristic. To perform arithmetic operations on data on the floating-point format, the actual arithmetic operations are performed on the signals of the mantissa portions of the data words, and the characteristics are used primarily to indicate the relative positions of the floating-point operands under consideration, and are utilized in determining the characteristic of the result of the arithmetic operation. For example, in adding two floating-point operands, each having its own characteristic and mantissa, the arithmetic section of the data processing system utilizes the two characteristics to determine the actual digit-by-digit alignment of the mantissa portions in preparation for perfoming the floating-point arithmetic operation. For an add operation, the aligned mantissas are added together to form a new floating-point mantissa, and a resultant floating-point word is generated as a result of the combination of the newly formed mantissa with the characteristic. Floating-point subtraction, multiplication, division, or format conversion, all involve manipulation of the characteristic. Normalization is the process of shifting the mantissa and adjusting the characteristic such that the most significant bit of the mantissa appears in a certain position.

The floating-point data words are stored, transferred, and processed, via a plurality of multiple-bit registers. Each bit position of a register represents a power of the radix of the register, and the modulus of the register is the radix raised to the power indicated by the number of bit positions of the register. For example, a 1's complement six-bit register has a modulus $2^6$, with the least singificant bit position having a value $2^0$, with each increasing bit position having a value of 2 raised to the power designated by the bit position. For use with operands in floating-point format, the registers must utilize sufficient bit positions for holding the representation of the mantissa and the characteristic. For single-precision format, the entire operand comprised of the sign, characteristic, and mantissa, is contained in a single register, however, the portion devoted to the mantissa is independent of the portion devoted to the characteristic. These entities are handled substantially independently.

The bit capacity of registers in the data processing system often relate to the number of bit positions in the memory registers. Operands in the floating-point format that are contained within the number of bit positions of a memory register capacity are often referred to as single-precision floating-point operands. The limitation of the number of bit positions to a single register obviously places limitations on the capacity and precision of the arithmetic manipulations. In order to increase the capacity of the floating-point operands, systems have been developed that utilize two full operands to comprise a single floating-point operand. This effectively doubles the bit capacity, and is commonly referred to as double-precision floating-point operation. In the double-precision format, the characteristic often times utilizes more bit positions than would be utilized for the single-precision format. In computing systems that utilize both single-precision and double-precision formats, systems have been devised for converting floating-point operands between the two systems of representation. For those systems that utilize a different number of bits positions to represent the characteristics between single-precision and double-precision, it is necessary that the conversion between formats provide for adjustment of the characteristic representation. Further, it is necessary that there be adjustments of the mantissa when the conversion is from double-precision to single-precision format, it is common to require that the number of the characteristic bits be reduced, and that certain bit positions in the mantissa be dropped. During the converse conversion, the number of bit positions of the characteristic is increased, and the additional number of bit positions of the mantissa is made available.

Both the characteristic and mantissa for floating-point arithmetic operations, whether they be single-or double-precisions may represent positive or negative values. The sign bit references represents the sign of the mantissa. To avoid using two separate sign designations, that is, one for the characteristic and one for the mantissa, within the same operand, a system of characteristic biasing has been developed to indicate the sign of the characteristic. For example, a single-precision floating-point operand that provides for an eight-bit characteristic, can express numerical values ranging from 0 through octal 377. By arbitrarily applying a bias of octal 200 to the actual characteristic, the zero point is effectively shifted and permits the numerical representation of minus octal 200 through octal 177. In this manner, the value of the characteristic indicates whether it is positive or negative, with those characteristic values having a numerical value of octal 200 or less, representing negative characteristic values. A similar biasing system is applied to double-precision characteristics, with the same purpose. For example, if an eleven-bit characteristic is utilized, a bias of octal 2000 establishes a mid-point with numerical values of octal 2000 or less being of a negative value and characteristic values of more than octal 2000 being of a positive value. It can be seen, of course, that when converting between a single-and double-precision formats, the biasing as well as the bit capacity must be adjusted.

In performing conversion from double-precision floating-point to single-precision floating-point, care must be taken to establish that the magnitude of the double-precision characteristic can be expressed in a number of bit positions available in the single-precision format. In the event that a double-precision floating-point characteristic has a numerical value greater than the upper positive range of the single-precision floating-point characteristic, an overflow fault will occur, and an indication of this failure should be provided. Similarly, a double-precision floating-point characteristic on the lower extremity of the range that extends beyond the bit capacity of the single-precision floating-point operand cannot be accurately converted, and will cause an underflow fault to occur. The characteristic biasing system, the conversion from double-precision floating-point to single-precision floating-point and for conversion from single-precision floating-point to double-precision floating-point is described in detail in U.S. Pat. No. 3,389,379 to G. J. Erickson, et al.

When adding or subtracting to floating-point operands, it is necessary that each of the mantissa portions be aligned so that bit-positions having similar weights will be properly added. This alignment shift is called normalization and is determined by the examination of each of the characteristic postions.

Typically, within the arithmetic section of the Instruction Processor of present day data processing systems, certain instructions required a normalizing process on either the input operand directly (such as a scale factor shift) or on the result of an operation on floating-point numbers (e.g. floating point add) to normalize the mantissa before packing the characteristic.

Usually, the hardware to accomplish this included a normalizer module which determined the shift count and the direction needed to normalize a 36-bit or a 72-bit operand to a particular bit. The operand was then shifted within a shift matrix by the amount and in the direction indicated by the normalizer module. In all of these known earlier systems, however, this normalization process was never throughchecked. That is, there was never an overall check made to determine whether the normalization indicated was, in fact, accomplished.

BRIEF DESCRIPTION OF THE INVENTION

A. Objects of the Invention

Accordingly, it is an object of this invention to provide an improved system of throughchecking a normalizer data path.

It is a further object of this invention to provide an improved method of throughchecking a normalizer data path.

It is a still further object of this invention to provide a system of throughchecking of a normalizer data path which provides a check on the operation of the normalizer module.

It is also an object of this invention to provide a method of throughchecking of a normalizer data path which checks on the operation of the normalizer module.

It is also another object of this invention to provide a system of throughchecking of a normalizer data path which is substantially cheaper than duplication.

It is another object of this invention to provide a system of throughchecking of a normalizer data path operations which involves both integer and floating-point formats in both single-and double-precision.

It is still another object of this invention to provide a system for the throughchecking of a normalizer data path which checks two normalizer modules plus the normalizer to shift matrix control designator path.

It is also an object of this invention to provide a system for the throughchecking of a normalizer data path which checks the shift matrix itself and the shift control designator to the shift matrix paths.

These and other more detailed and specific objectives of the invention will become clearer to those skilled in the art from a consideration of the following description of the preferred embodiment.

B. Summary of the Invention

This invention provides a post or check normalizer which checks the validity of the count and direction supplied by the main normalizer by using the shifted output of the shift matrix as its input. Since there are only certain bits to which the instructions of the computing device of the preferred embodiment normalize, only enough bits to cover those positions are data for the post or check normalizer. If the main normalizer and the associated circuits operated correctly, the post or check normalizer will determine that its input is normalized by providing a no-error output signal. An error will be detected if the post or check normalizer provides a non-zero value output at the appropriate time of the particular instructions involved, and an error signal will be provided.

BRIEF DESCRIPTION OF THE SEVERAL VIEWS OF THE DRAWINGS

The foregoing objects and the summary will be more readily understood when read in conjunction with the accompanying drawings in which like reference numerals indicate corresponding parts.

FIG. 4 illustrates the format of the single-precision operands;

FIG. 6a to FIG. 6c when arranged as shown in FIG. 6 is a block diagram of the arithmetic unit that incorporates the subject invention;

FIG. 9 illustrates the detailed logic of the error designator and the OR circuit used in the checking circuit of the present invention.

DETAILED DESCRIPTION OF THE PREFERRED EMBODIMENT

Figure 1:
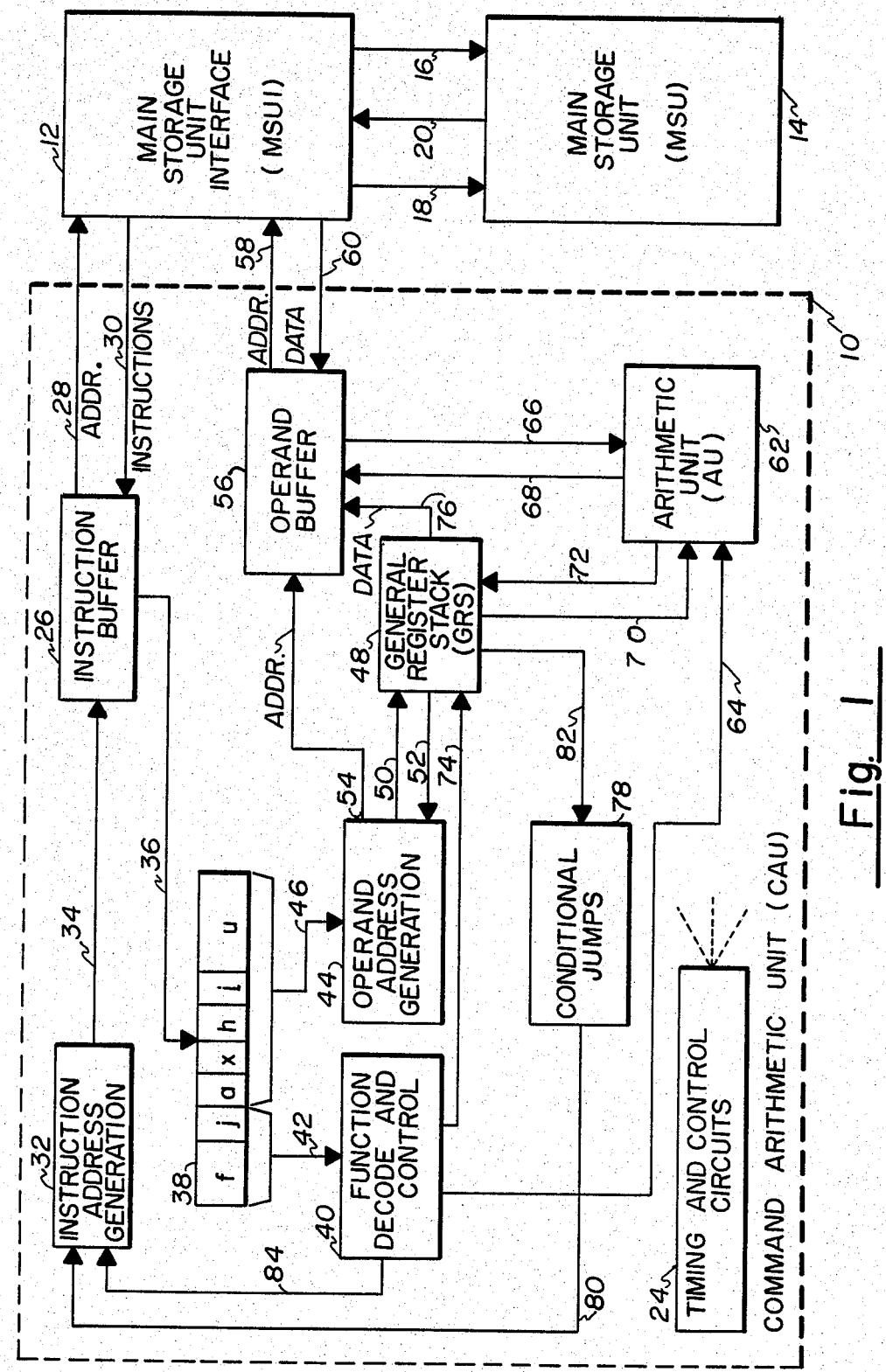
FIG. 1 is a simplified functional diagram of a data processing system which incorporates the subject invention and illustrates the functional relationship of the various data processing system and controls.

FIG. 1 is a simplified functional diagram of a data processing system which incorporates the subject invention and illustrates the functional relationship of the various data processing components and controls. The system utilizes a Command Arithmetic Unit, hereinafter referred to as CAU 10, and Main Storage Unit Interface, hereinafter referred to as MSUI 12, and a Main Storage Unit, hereinafter referred to MSU 14. The lines with arrowheads indicate direction of flow of data or flow of control. MSU 14 is a large-scale memory having addressable memory registers in which data words can be stored and from data words can be read. The MSU 14 stores instruction words which are utilized to direct and control the operation of the data processing system, and data words which are the subject of or result of operations of the data processing system, both of which are referred to as operands. MSU 14 can be selected from any of the types of addressable storage devices available commercially, it being understood that the requirement be that the specification of an address and a write control on line 16 will result in addressing the specified memory address and providing the recording of the operand received on line 18. The specification of a memory address and a read function on line 16 will result in the contents of the specified memory register being read and supplied on line 20. The Main Storage Unit Interface 12 operates as the clearing house for all data transfers to and from MSU 14. The system illustrated is shown in simplified form, it being understood that MSUI 12 can accommodate more than one CAU 10, as well as various other input/output devices not shown. The memory referencing is such that instructions and data words are both capable of being stored in MSU and referenced therefrom. The actual memory addressing and accessing systems do not aid in an understanding of the invention, and are described in general terms only to provide an environment in which the invention functions. Similarly, the MUSI detailed functioning and handling of requests and responses is not deemed necessary to an understanding of the invention.

The Command Arithmetic Unit 10 includes a Timing and Control 24 that operates to direct all functional sections, including interpreting instructions and directing the various computational tasks to be performed by the directed functional units. Instructions are stored in the Instruction Buffer 26 where a plurality of individual instructions are stored for sequential or directed execution. Instructions are obtained from the MSU via MSUI by sending an address on line 28 which results in a grouping of instructions to be read from the MSU and returned to the Instruction Buffer over line 30. The address of instructions to be generated are derived through the Instruction Address Generation circuitry 32 which includes a register for storing the next instruction address. The address of the instruction is directed on line 34 to the Instruction Buffer 26 where it is read on line 36 to the instruction register 38. The Instruction Address Generation circuitry 32 includes a means for automatically advancing the address of the instruction to the next sequential address which will be operative. The next instruction will be selected upon completion of the present instruction provided there are no jump conditions that occur during the execution of the present instruction. Function Decode and Control 40 utilizes a portion of the signals stored in the Instruction Register 38, as received on line 42, and operates to generate the signals necessary to properly execute the instruction. The Operand Address Generation circuitry 44 is coupled to a portion of the Instruction Register 38 by line 46, and operates to form an absolute address of the operand from the address designation, and address indexing designations specified in the instruction. The General Register Stack (GRS) 48 consists of a plurality of multiple-bit registers to provide fast internal storage to the CAU, and is divided into an odd-address and even-address structure to allow simultaneous referencing of double word lengths to provide for the accommodation of double-precision instructions. The Operand and Address Generation circuitry 44 directs requests to the GRS over line 50, and receives information on line 52. Once the absolute address is generated, it is transmitted on line 54 to the Operand Buffer 56. The address is transmitted on line 58 to the MSUI for obtaining the requested operand from the MSU, which in turn transmits it back over line 60 to the Operand Buffer 56. It should be noted, that the Operand Buffer 56 operates to transfer block of data to minimize the needs of access to the MSU, the details of the block transfers not being set forth since they do not add to an understanding of the invention.

The Arithmetic Unit (AU) 62 functions to perform the various arithmetic operations specified by the instruction. The system for handling of floating-point calculations and the improved characteristic adder are encompassed within the AU. The Function Decode and Control 40 provides control signals on line 64 to the AU, and the operands are provided from the Operand Buffer 56 on line 66. Results of the arithmetic operations are transmitted on line 68 to the Operand Buffer. The AU also receives input data from the GRS 48 on line 70, and provides interim storage to the GRS over line 72. The Function Decode and Control provides selection signals on line 74 to the GRS. The GRS 48 also is capable of transmitting data on line 76 to the Operand Buffer 56 where it is available for storage in the MSU. The CAU also functions to test for jump conditions through the use of Conditional Jumps circuitry 78, which provides signals on line 80 for altering the instruction address sequence in response to the satisfaction of tested jump conditions. The Conditional Jump circuitry 78 receives input signals from GRS on line 82 which are utilized in the jump evaluation. Once an arithmetic operation has been completed, and in the absence of a conditional jump situation, the Function Decode and Control 40 provides signals on line 84 indicating the completion of the instruction and generating the initiation of the next instruction address.

The Arithmetic Unit 62 includes, as will be described in more detail below, a 1's complement subtractive adder that is capable of segmented adds, a plurality of addressable Accumulators for storing operands and intermediate results of arithmetic computation, a high speed shift matrix, a multiplier for fixed or floating-point multiplication, and circuitry for performing single- or double-precision floating-point arithmetic.

Figure 2:
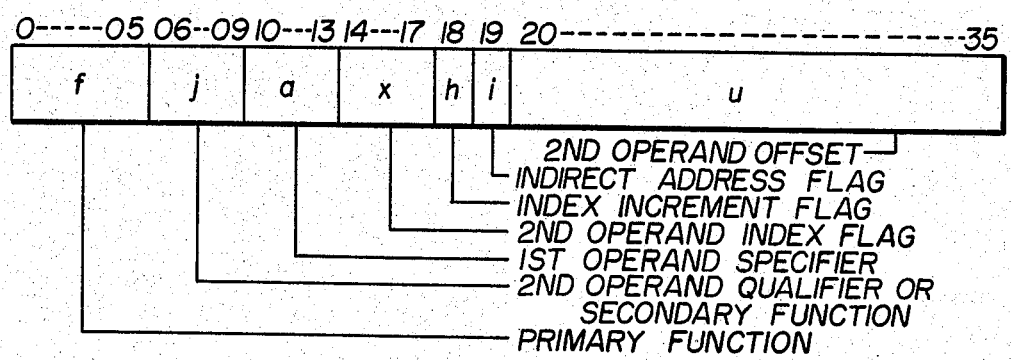
FIG. 2 illustrates the format of the instruction word.

FIG. 2 illustrates the format of the instruction word for the embodiment of the data processing system which incorporates the subject invention. The instruction word utilizes 36-bits organized into several distinct parts of designators. The various field and designators will be discussed in order starting from the left and proceeding to the right-most end of the instruction word. The f-field represents the function code of the command operation to performed by the computer. Illustratively, the f-field may hold the bit combination for dictating that the computer should perform an add operation, a jump operation, a floating-point instruction, and the like. The function code for the most instructions utilizes 6-bits; however, for certain operations, the j-field is also combined as part of the function code. This expands the capacity to distinguish between the specific operations. The j-field is 4-bits and it utilizes this control as the partial-word transfer designator. In its normal operation, the j-field determines whether an entire data word or only a specified part of a data word is to be transferred to or from the CAU. As previously mentioned, in certain instructions, the j-field serves as an additional part of the function code designator. When the j-field is utilized in its normal function, it specifies which half-word, third-word, or sixth-word is to be used. When reading from the MSU, the transfer is always into the least significant position of the register in the CAU. In transfers from the CAU, the j-field specifies to which word, half-word, third-word, quarter-word, or sixth-word, the least significant portion of the word to be transferred from the CAU will be made. Bit positions within the specified address in MSU which are not involved in the transfer are not changed. For various combinations of sign extension or lack of the j-field, the u-field of the instruction becomes the effective operand rather than the address of the operand as is the normal case. The a-field is four-bits and is termed the A-register designator. For normal operation, the a-field specifies one of a plurality of A-registers and in some special cases it can also specify one of a plurality of other Registers. These special registers are addressable locations within the CAU in the GRS. Other operations concerned with the a-field are not relevant to the subject invention and will not be described. The x-field is four-bits and is used to reference any one of the index registers that are contained in the GRS. When the modification of the u-field is specified, the index registers are referred to as X-Registers. When the x-field is set to zero, modification to the u-field will not take place. If the x-designator is coded with a numerical value, the corresponding Register is referenced and its contents are added to the u-field to form the effective address. The formation of the absolute address may also involve the use of further base address addressing, and will not be described in detail. The h-field is one-bit and is termed the incrementation designator. The i-field is one-bit and is used for indirect addressing.

Figure 3:
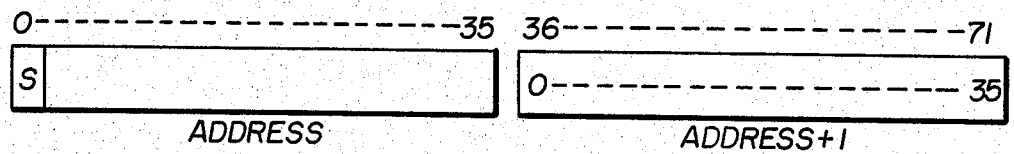
FIG. 3 illustrates the format of the data operands.

FIG. 3 represents the form of operands, other than instruction operands. For this embodiment, the single-precision data operand is comprised of 36 bits, numbered from $00$ through 35 commencing from the most significant bit position and progressing to the least significant bit position. The zero-bit position is the sign of the data word, with a $0$ representing a positive value and a 1 representing a negative value. For positive values, 1's in the remaining bit positions are significant in the determination of the numerical value. If the sign bit contains a number 1, the negative word exists, and $0$'s in the remaining bit positions represent significant data in determining the value of the negative number of the relationships. Example I illustrates these concepts.

EXAMPLE I

Assume a 6-bit word:

|  |  | sign | data |
|---|---|---|---|
| +5 | = | 0 | $00101_2$ |
| −5 | = | 1 | $11010_2$ |

The preferred embodiment that incorporates the subject invention utilizes 1's complement for performing binary arithmetic. As is well known, the 1's complement of a binary number is formed by changing all 1's in the word to 0's and changing all 0's in the word to 1's. An arithmetic data word of positive value, when complemented, becomes the negative value of the word; and, a negative value when complemented, becomes the positive value of the word. Example II illustrates the 1's complement system.

EXAMPLE II

Assume a 6-bit word:

| | |
|---|---|
| +5 = $000101_2$ = | complement of $111010_2$ (−5) |
| −5 = $111010_2$ = | complement of $000101_2$ (5) |

The absolute value of an arithmetic number is the numerical value of the number regardless of sign, as illustrated in Example III.

EXAMPLE III

| Binary Value | Absolute Value |
|---|---|
| +14 = 001110 | 001110 = 14 |
| −14 = 110001 | 001110 = 14 |

A double-precision data word is generated by considering two words of 36-bits each as a single operand. The most significant portion of the double-precision word is located at an address, and the least-significant half of the data word is located at the address plus 1. When operating as double-precision operands, the bits are considered sequentially from 00 through 71.

In the processor illustrated and described in FIG. 1, a positive mantissa, that is the numeral value of the data, is always considered to be a fraction. When normalized, the leading bit of the mantissa is equal to 1 and the value of a positive mantissa will always fall between 1 and $\frac{1}{2}$ inclusive. A negative mantissa is normalized when the leading bit of the mantissa is equal to 0, and the value of a negative mantissa will always fall between the value of 1 and $\frac{1}{2}$ inclusive. As mentioned above, the arithmetic system is capable of operating on two forms of floating-point operands, that is, single-precision and double-precision.

Figures 4, 6, 6A:
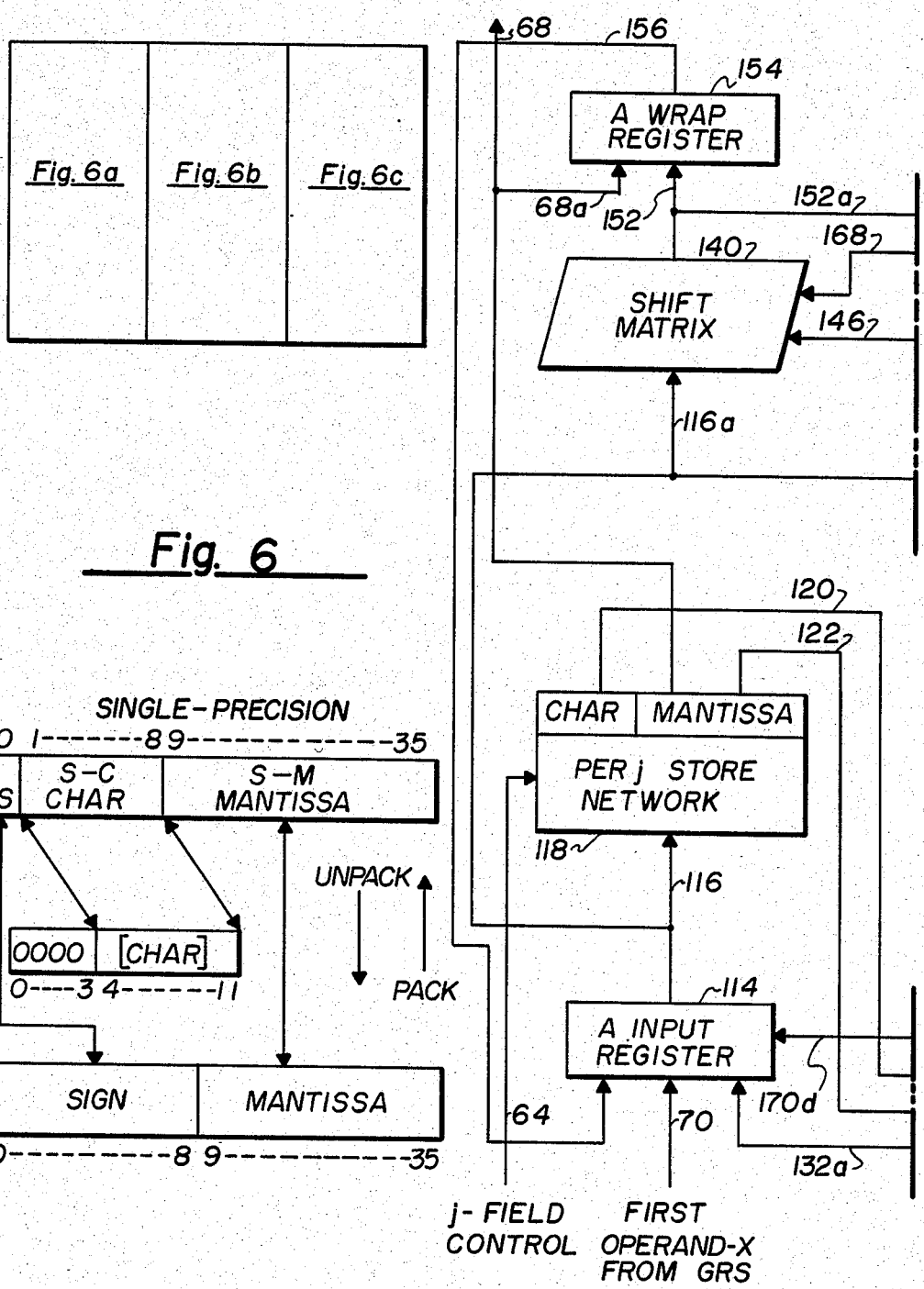

Floating point addition, multiplication and division may produce a residue word which contains a 27-bit mantissa, however, the sum of both words are not sixty bits as in double precision. Further, the two mantissa's are not as simply related as in double precision. Also, the characteristic of the result is only single precision (8-bits). Double-precision arithmetic instructions also produce double-precision or double-length results. FIG. 4 illustrates the format of the single-precision operand for the embodiment of the subject invention. The single-precision mantissa S-M is 27 bits and is stored in register bit position 9 through 35. The single-precision characteristic S-C is 8-bits and resides in a storage register bits 1 through 8. The sign S resides in a bit position 0. The mantissa S-M is the numerical value of the data and, as stated above, is always considered to be a fraction. It should be noted that the characteristic S-C is not the exponent of the mantissa; but, instead, is the exponent of the numerical base.

Figure 5:
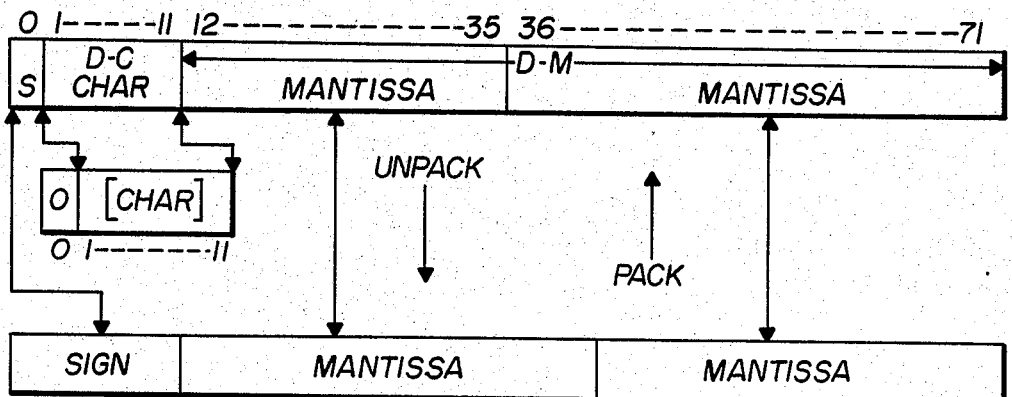
FIG. 5 illustrates the format of the double-precision operands.

FIG. 5 illustrates the format of a double-precision operand. It will be noted that two full registers are utilized to store the double-precision operand. Recalling from above that a single-precision operand is illustratively shown as 36-bits, the double-precision operand requires 72-bits to completely define it. The least significant portion of the double-precision mantissa D-M is stored in the 36-bits which are designated as the address +1. The most significant portion of double-precision mantissa D-M are stored in the 24 lower ordered bit positions of the designated address. The composite portion of the address and the entire address +1 results in a 60-bit double-precision mantissa. The double-precision characteristic D-C is 11-bits in capacity and resides in bit positions 1 through 11 of the address. The sign of the mantissa S is located in the highest ordered bit position of the address.

Both the characteristic and mantissa for floating-point arithmetic operations, whether they be single-or double-precision, may represent positive or negative values. The sign bit S denotes the sign of the mantissa, and will be described in more detail below. To avoid using two separate signs, that is, one for the characteristic and one for the mantissa, within the same word, a system of characteristic biasing is employed to indicate the sign of the characteristic.

For single-precision, this consists of adding to the true or unbiased characteristic the bias value of 128 ($200_8$). The 8-bit characteristic permits a range of $-128$ to $+127$ ($-200_8$ to $+177_8$) as shown in Table I.

TABLE I

SINGLE-PRECISION
[Characteristic Values]

| Decimal | | Octal | |
|---|---|---|---|
| True | Biased | True | Biased |
| −128 | 000 | −200 | $000_8$ |
| 000 | 128 | 000 | $200_8$ |
| +127 | 225 | 177 | $377_8$ |

To illustrate the principles involves, the value $0.75_{10} \times 2^3$ is presented with every possible combination of signs.

| | | Single Precision: | |
|---|---|---|---|
| 1. | $.75 \times 2^3$ | $.75 \times 2^3$ (unbiased) | = 003 600 000 $000_8$ |
| | | Bias | = 200 |
| 2. | $-.75 \times 2^3$ | $.75 \times 2^3$ | = 203 600 000 $000_8$ |
| | | $.75 \times 2^3$ (unbiased) | = 003 600 000 $000_8$ |
| | | Bias | = 200 |
| | | $.75 \times 2^3$ | = 203 600 000 $000_8$ |
| | | 1's complement | |
| | | $-.75 \times 2^3$ | = 574 177 777 $777_8$ |
| 3. | $.75 \times 2^{-3}$ | $.75 \times 2^{-3}$ (unbiased) | = (−3) 600 000 $000_8$ |
| | | Bias | 200 |
| 4. | $-.75 \times 2^{-3}$ | $.75 \times 2^{-3}$ | = 175 600 000 $000_8$ |
| | | $.75 \times 2^{-3}$ (unbiased) | = (−3) 600 000 $000_8$ |
| | | Bias | = 200 |
| | | $.75 \times 2^{-3}$ | 175 600 000 $000_8$ |
| | | 1's Complement | |
| | | $-.75 \times 2^3$ | = 602 177 777 $777_8$ |

For double-precision, the true or unbiased characteristic is added to a bias value of 1024, ($2000_8$). The 11-bit characteristic permits range of values shown in Table II.

TABLE II

DOUBLE-PRECISION
[Characteristic Values]

| Decimal | | Octal | |
|---|---|---|---|
| True | Biased | True | Biased |
| −1024 | 0000 | −2000 | $0000_8$ |
| 0000 | 1024 | 0000 | $2000_8$ |
| +1023 | 2047 | 1777 | $3777_8$ |

TABLE II-continued

DOUBLE-PRECISION
[Characteristic Values]

| | | Double-Precision: | |
|---|---|---|---|
| 1. | $.75 \times 2^3$ | $.75 \times 2^3$ | = 0003 60 000 000 000 000 000 $000_8$ |
| | | Bias | = 2000 |
| 2. | $-.75 \times 2^3$ | $.75 \times 2^3$ | = 2003 60 000 000 000 000 000 $000_8$ |
| | | $-.75 \times 2^3$ | = 0003 60 000 000 000 000 000 $000_8$ |
| | | Bias | = 2000 |
| 3. | $.75 \times 2^{-3}$ | $-.75 \times 2^3$ | = 2003 60 000 000 000 000 000 $000_8$ |
| | | 1's Complement | |
| | | $-.75 \times 2^3$ | = 5774 17 777 777 777 777 777 $777_8$ |
| | | $.75 \times 2^{-3}$ | = (−3) 60 000 000 000 000 000 $000_8$ |
| | | Bias | = 2000 |
| 4. | $-.75 \times 2^{-3}$ | $.75 \times 2^{-3}$ | = 1775 60 000 000 000 000 000 $000_8$ |
| | | $.75 \times 2^{-3}$ | = (−3) 60 000 000 000 000 000 $000_8$ |
| | | Bias | = 2000 |
| | | $.75 \times 2^{-3}$ | = 1775 60 000 000 000 000 000 $000_8$ |
| | | 1's Complement | |
| | | $-.75 \times 2^{-3}$ | = 6002 17 777 777 777 777 777 $777_8$ |

The foregoing illustrated biasing of the single-precision and double-precision characteristics. It allows negative or positive excursions from the medium bias value. This biasing system permits the direct addition or subtraction of the mantissa and characteristics of two floating-point operands and permits the negative of a given positive value to be formed by calculating the 1's Complement value for the positive operand.

When the single-precision operand is unpacked for manipulation, the characteristic S-C is taken in its magnitude form and shifted right three places so that it can be manipulated in the 12-bit characteristic adder that will be described in more detail below In this shifting process, bit positions 0 through 3 are filled to 0's. The sign S of the single-precision word is filled into bit positions 0 through 8 and combined with the mantissa S-M as an operand ready for consideration by the AU. When a single-precision operand is to be packed, that is to be recombined, after a floating-point operation, the 8-bit characteristic is utilized in its magnitude form for positive mantissas, and is left-shifted three places to bit positions 1 through 8 of the resultant of floating-point word. The sign S of the resultant calculation is transmitted to the 0-bit position, and the bit positions 9 through 35 of the result of the calculation are packed into bit positions 9 through 35 of the resultant floating-point word. If the sign S of the resultant mantissa is negative, the characteristic is subjected to a 1's complement operation before being shifted and packed into the resultant floating-point word. See Table I for the treatment of biasing and use of true or 1's complement values of the characteristic. Referring again to FIG. 5, the double-precision floating-point operand is unpacked by transferring the magnitude value of the characteristic D-C in direct alignment for use with the characteristic adder. The sign S is filled in bit positions 0 through 11 and combined with bit positions 12 through 35 of the address word. The least significant half of the double-precision operand is derived from the address +1 and is transferred directly as bit positions 36 through 71. The packing process proceeds similarly to that described with regard to the single-precision floating-point operands, with the characteristic being transferred in magnitude form to bit positions 1 through 11 for positive mantissa values. Again, if the mantissa has a negative value, the characteristic is subjected to a 1's complement operation prior to being transmitted to bit positions 1 through 11. The sign S of the mantissa is transferred to bit position 0, and the values of the bit positions 12 through 35 are transferred directly to bit positions 12 through 35 of the address word. Bit positions 36 through 71 are transferred to the address +1 word. The biasing and treatment of positive and negative values is set forth in detail in Table II.

Figure 6B:
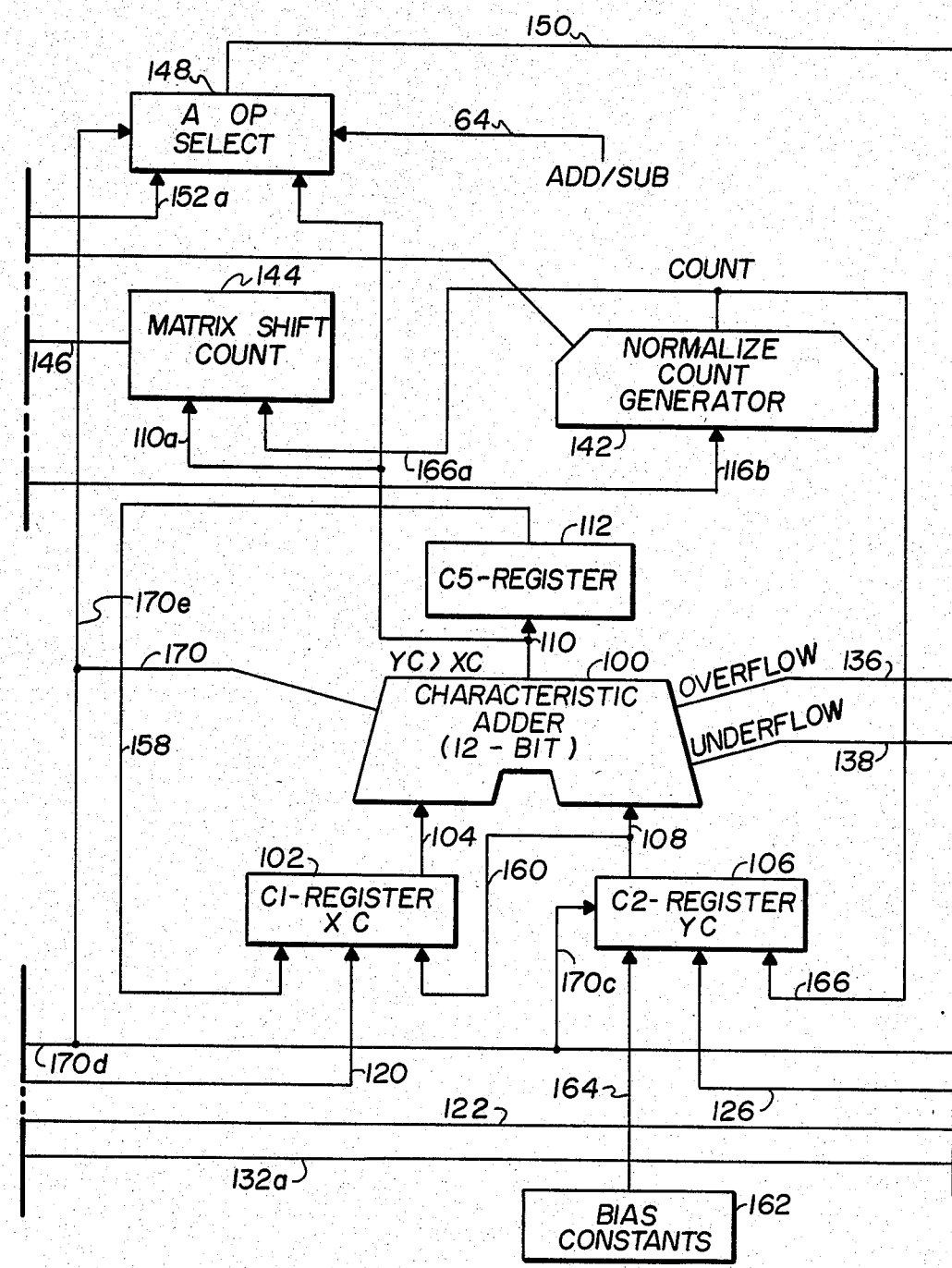

FIG. 6a through FIG. 6c, when arranged as shown in FIG. 6, comprises a block diagram of the portion of the Arithmetic Unit 62 that is utilized in the floating-point arithmetic operations. The system utilized a Main Adder, referred to as ALU, 90, which is capable of performing addition of operands received in parallel on lines 92 and 94, and forming the sum output on line 96. The ALU is a subtractive adder of a type known in the art, capable of performing single-precision addition of two 36-bit operands, double-precision addition of two 72-bit operands, as well as capable of performing simultaneous additions or subtractions of operands partitioned as half-words, or third-words. The ALU is utilized in floating-point arithmetic operations to form the sum or difference of the mantissa portions of the floating-point operands. One set of inputs is applied from the A-register 97 and the other operand is provided by the U-register 98. It is understood that 36-bit portions of the A-register and U-register are utilized for the single-precision operation, while each of these registers is comprised of 74-bits for the double-precision calculations. The Characteristic Adder 100 comprises a 12-bit subtractive adder, which will be described in detail below. The Characteristic Adder 100 receives a 12-bit set of input signals from the C1-Register 102 on line 104, and the other 12-bit operand from the C2-Register 106 on line 108. The sum is provided on line 110 and is utilized as an input to the C5-Register 112.

The first operand, designated X, is received from GRS on line 70, and is applied as an input to the A Input Register 114, whose output is applied on line 116 as input to the Per j Store Network 118. In response to the j-Field Control received on line 64, this network unpacks the floating-point operand, as previously described, with the unpacked characteristic being directed on line 120 as an input to the C1-Register 102. The appropriately unpacked mantissa is directed on line 122 as a set of input signals to the A-Register 97. The second operand, designated Y, is received on line 66, and is unpacked by the Per j Read Network 124 in accordance with the dictates of the j-Field Control received on line 64. The unpacked characteristic is directed on line 126 as one set of input signals to the C2-Register 106, and the unpacked mantissa is directed on line 128 as one set of input signals to the U-Register 98.

The sum or difference output signals from ALU 90 transferred on line 96 is stored in the ALU Out Register 130, and are available on line 132 to the Output Gates 134, and on line 132a as a second set of input signals to the A Input Register 114.

Characteristic Adder 100 provides Overflow signals on line 136 to the Output Gates and an Underflow signal on line 138 to the Output Gates 134. When there is neither an Overflow or Underflow condition, the Output Gates will be satisfied, and the signal received on line 132 will be passed out to GRS on line 72.

The output signals from the A Input Register 114 are provided on line 116a as one set of input signals to the Shift Matrix 140, and on line 116b to the Normalize Count Generator 142. The Shift Matrix is utilized in aligning the mantissa portions of the floating-point operands prior to execution of the arithmetic operations, and is further utilized in the normalization of the resultant floating-point mantissa. The output signal from the Characteristic Adder 100 is provided on line 110a as one set of input signals to the Matrix Shift Count circuitry 144, which provides shift count control signals on line 146 to control the functioning of the Shift Matrix. The Characteristic Adder output signals are also applied on line 110b as input signals to the A OP Select circuitry 148. The output of this circuitry is provided on line 150, and is directed on line 150a as one set of input signals to the A-Register 97, and on line 150b as one set of input signals to the U-Register 98, and on lines 150c as one set of input signals to the ALU Out Register 130. As will be described in more detail below, the control signals received on line 64 will determine whether or not the output signals on line 150 will be transmitted as true or complement, dependent upon whether the selection is for addition or subtraction.

The output of the Shift Matrix 140 is provided on line 152 to the A Wrap Register 154 and on line 152a to the A OP Select circuitry 148. The output signals from the Per j Store Network 118 provided on line 68 as output to the buffer, are also provided on line 68a as an input to the A Wrap Register 154. The output provided therefrom on line 156 is directed as another set of input signals to the A Input Register 114.

The output signals from the C5-Register 112 are directed on line 158 as a set of input signals to the C1-Register 102. The output signals from the C2-Register 106 are directed as yet another set of input signals to the C1-Register 102 on line 160. The C2-Register 106 is adapted to receive the Bias Constants 162 on line 164, and receives the output signals from the Normalize Count Generator 142 on line 166. This count signal is also applied on line 166a as one set of input signals to the Matrix Shift Count circuitry 144.

The Normalize Count Generator 142 provides a signal as to whether the shift is right or left for normalization on line 168 to control the operation of the Shift Matrix 140 during the normalization process.

The Characteristic Adder 100 provides a signal on line 170 that determines whether the characteristic XC of the first operand is greater or smaller than the characteristic YC of the second operand. This control signal is utilized as a control signal on line 170a to the A-Register 97, on line 170b as a control to the U-Register 98, as a control on line 170c to control the operation of the C2-Register 106, as a control on line 170d to the A Input Register 114, and as a control on line 170e to the A OP Select circuitry 148. The functions of the add and subtract instructions are illustrated in Table III.

TABLE III

| f | j | | |
|---|---|---|---|
| 76,00 | Single-Precision Floating Add | (FA) |
| | $(A_a) + (U) \rightarrow A_a$ | |
| 76,00 | Single-Precision Floating Add Negative | (Subtract) (FAN) |
| | $(A_a) - (U) \rightarrow A_a$ | |
| 76,10 | Double Precision Floating Add | (DFA) |
| | $(A_a, A_{a+1}) + (U, U+1) \rightarrow A_a, A_{a+1}$ | |
| 76,11 | Double-Precision Floating Add Negative | (Subtract) (DFAN) |
| | $(A_a, A_{a+1}) - (U, U+1) \rightarrow A_a, A_{a+1}$ | |

In this configuration, the f-Field of the instruction word designates the function code, and is 76 for the floating-point instructions. The j-Field is specified in Table III and comprised the designations that control the functioning of the packing and unpacking of the floating-point operands. In Table III, the $A_a$ designates the A-Register in the GRS specified by the a-Field, and the U designates the absolute address of the second operand determined by the translation of the instruction word together with its indexing.

The functioning of the Characteristic Adder within the total arithmetic system will be described with reference to a basic single-precision floating-point add sequence. It should be understood that the operation of the Arithmetic Unit 62 is subjected to timing and control pulses as necessary for the particular type of circuitry utilized to implement the system. This timing and control is well understood, and is not shown in detail since it does not add to an understanding of the invention, and further can be readily derived by those skilled in the art. The following steps occur in sequence with the functional steps having been designated for purposes of reference by the letter T. It should not, however, be considered that these sequential steps necessarily occur at specific timing pulses so designated, but instead, should be considered to be sequences that occur in the order set forth.

T1 Sequence. The first operand X is received on line 70 from the GRS and is stored in the A Input Register 144. The operand X is directed on line 116 to the Per j Store Network 118 where it is unpacked. The characteristic XC is right-justified in a 12-bit field and is directed in magnitude form on line 120 to the C1-Register 102. The Characteristic Adder is of a 12-bit capacity for this embodiment, and is utilized for both the single-precision and double-precision characteristics. The use of 11-bits for the double-precision characteristic makes it necessary to provide the right shift of the single-precision characteristic so that it functions properly in the Adder. During unpacking, the mantissa is sign-filled and directed as a 36-bit operand on line 122 to the A-Register 97. The details of the functioning of the Per j Store Network 118 as controlled by the j-Field control received on line 64 will not be described in detail.

T2 Sequence. The second operand Y is received on line 66 and is unpacked as directed by the Per j Road Network under direction of control received from the j-Field control on line 64. Unpacking occurs in a manner similar to that just described. The characteristic YC is right-justified and provided on line 126 as input to the C2-Register 106. The characteristic is transferred in magnitude form. At the same time the mantissa of the Y operand is sign-filled and transferred on line 128 to the U-Register 98. When the C1-Register and the C2-Register have both been loaded, the Characteristic Adder 100 subtracts YC from XC and produces the difference in magnitude form on line 110. Simultaneously, a signal is provided on line 170 which indicates whether XC or YC is the smaller of the two.

T3 Sequence. The magnitude of the characteristic difference is loaded into the Matrix Shift Count Register 144, where it is utilized for controlling the Shift Matrix 140 in the alignment of the appropriately selected one of the mantissa operands under consideration. If YC is smaller than XC the control signal on line 170 causes the contents of U-Register to be transferred through ALU 90 to the ALU Out Register 130, where it is then transferred to the A Input Register 114. The Shift Matrix 140 is placed in a right-shift sign-fill shift mode to align the smaller mantissa to the larger, and the contents of the A Input Register 114 is directed on line 116a to the Shift Matrix for alignment in accordance with the count provided from the Matrix Shift Count 144. The output of the Shift Matrix 140 is directed on line 152a to the A OP Select 148. If it had been determined that YC is greater than XC, it would indicate that the X operand would have to be shifted for alignment. In this mode of operation, the U-Register 98 would remain unaltered since it would contain the properly aligned mantissa. In this operation, the unpacked and sign filled mantissa for operand X which had been directed from the Per j Store Network 118 on line 68a to the A Wrap Register 154, would then be re-introduced on line 156 to the A Input Register 114. Thereafter, it would be subjected to the Shift Matrix and shifted under control of the Matrix Shift Count and directed to the A OP Select 148. In this manner, it can be seen that the smaller value operand is selected and is shifted for appropriate alignment.

T4 Sequence. The appropriately positioned mantissa stored in the A Op Select 148 is available on line 150 to the A-Register 97 and the U-Register 98. It will be recalled that the A-Register was originally loaded with the X operand mantissa and the U-Register 98 was originally loaded with the Y operand mantissa. If it was determined that YC is greater than XC, the signal on line 170a would direct the appropriately shifted X operand mantissa to the A-Register 97. Alternatively, if it was determined that XC was greater than YC, the control signal on line 170b would control the transfer of the appropriately shifted Y operand mantissa on line 150b to the U-Register 98. In either case, the unshifted mantissa is stored and available in the other register. At this time, the Main Adder 90 causes the addition (or subtraction for subtract instructions) in 1's complement form to be produced on line 96, thereby producing the unnormalized sum (difference) which is stored in the ALU Out Register 130. In order to select and retain the larger characteristic, an evaluation is made such that if XC is greater YC the contents of the C1-Register 102 and the C2-Register 106 are unaltered. However, if YC is greater than XC, YC is transferred on line 160 to the C1-Register.

T5 Sequence. The sum (difference) mantissa is transferred from the ALU Out Register 130 on line 132a to the A Input Register 114. This sum is transferred on line 116b to the Normalize Count Generator 142 where it is evaluated for determination of the shift count and direction necessary to normalize the mantissa. The shift count is directed on line 166a to the Matrix Shift Count 144, and is directed on line 166 to the C2-Register 106. The unnormalized mantissa is directed on line 166a to the Shift Matrix 140. The direction of shift is selected by the signal on line 168. The combination of the direction and the shift count provided on line 146 causes the Shift Matrix to normalize the mantissa. The normalize mantissa is transferred on line 152a to the A OP Select 148.

T6 Sequence. The resultant characteristic is adjusted according to the normalization of the resultant mantissa. It will be recalled that the larger of the two characteristics has been established in the C1-Register 102. The normalization count has been stored in the C2-Register 106. If a right shift normalization was specified, the Characteristic Adder 100 performs addition of the two input terms. If a left shift was specified for normalization, the Characteristic Adder subtracts the contents of the C2-Register from the C1-Register. At this time, characteristic overflow or characteristic underflow is tested. Overflow is indicated by a signal on line 136 and results if an add is performed for right normalization and the resultant characteristic has a 1 in any of bit positions 1, 2, or 3. Underflow results in a signal on line 138, and occurs if a subtract for left renormalization is performed and the resultant characteristic is negative as indicated by a 1 in the 0-bit position. If neither of these conditions occur, the resultant characteristic is within the permissible range. If the resultant mantissa is negative, the adjusted characteristic is complemented by the Characteristic Adder. For a single-precision floating-point add or subtract operation, the resultant characteristic, either or true or complemented, is then shifted left three places in preparation for repacking. This finally selected and shifted characteristic is transferred on line 110b to the A OP Select 148.

T7 Sequence. The merged floating-point operand comprising the adjusted characteristics and the renormalized mantissa is transferred on line 150c to the ALU Out Register 150. The output of this register is directed on line 132 to the Output Gates 134. If there is neither an overflow signal on line 136, nor an underflow signal on line 138, the Output Gates 134 will be enabled and the result of the floating-point operation will be transferred on line 72 for storage in the GRS.

The T Sequence should not be considered to be discrete timing sequences, but instead, are intended to describe the various functions that occur and their sequential relationship. The precise circuit timing would be readily developed by those skilled in the art, and would depend upon the type of circuitry utilized in the implementation. From the description of the floating-point add, it can be seen that the characteristic adder is utilized in the functions of calculating a shift count for aligning the smaller operand, determining the resultant characteristic following the completion of the operation, providing the 1's complement of the characteristic for a negative mantissa, providing the magnitude value of the characteristic during calculation, indicating characteristic underflow and overflow, and providing for automatic shifting of the characteristic for repacking. In addition to these functions, the characteristic adder includes provisions for providing the 1's complement of the input signal, or not providing the 1's complement of the input signal depending upon whether an add or subtraction operation is to be performed. Further, the characteristic adder provides an evaluation of the calculation when it is to be used as a shift count for mantissa alignment, that indicates a requested shift count that would exceed the capacity of the shift matrix. This would indicate the difference in the two floating-point operands is so great, that when aligned, the smaller would be beyond the range of alignment with the larger.

Figure 7B:
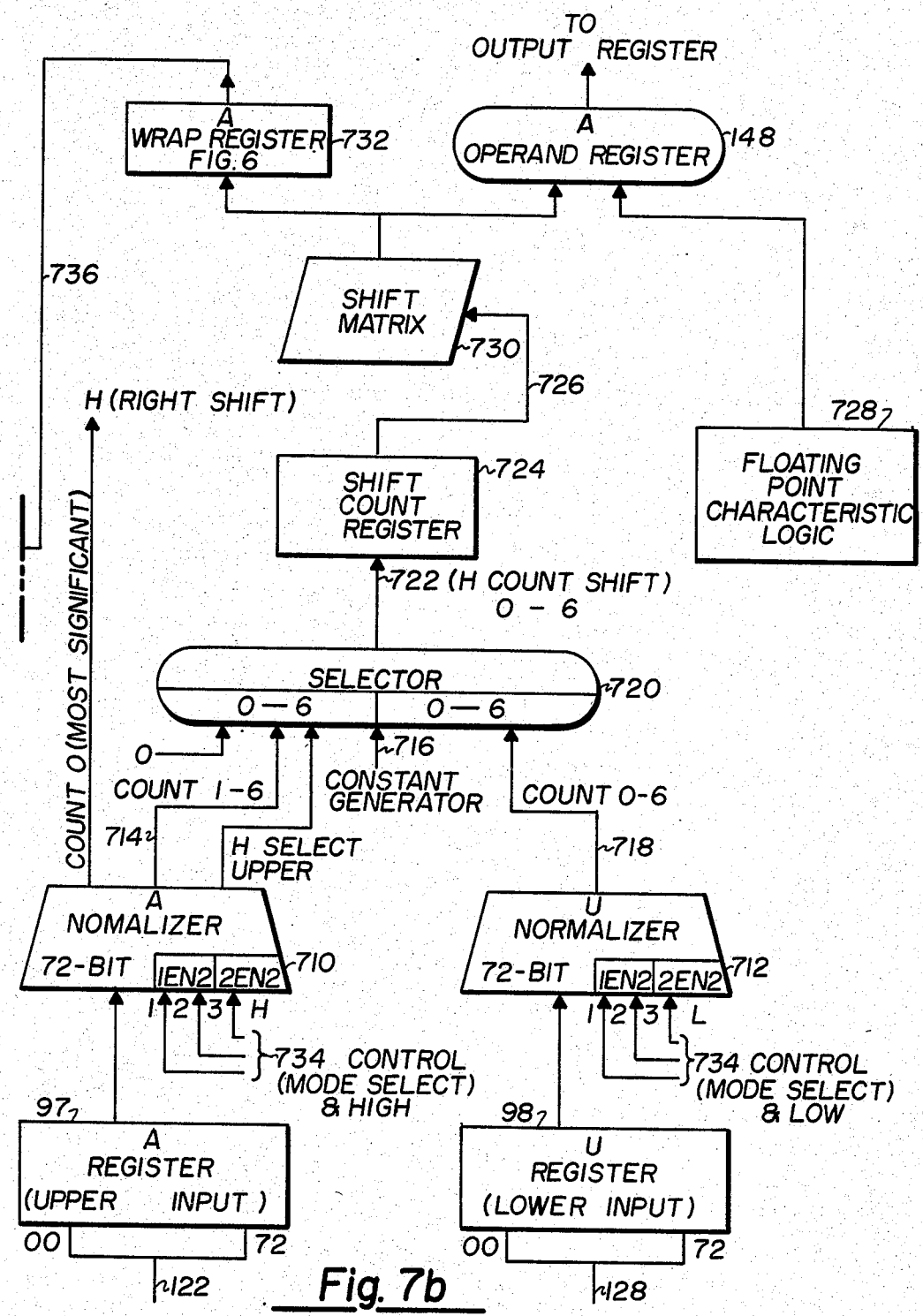
FIG. 7 is a more detailed block diagram of the subject invention itself showing its relationship to the elements of the Arithmetic Unit of FIG. 6.

Referring next to FIG. 7, there is illustrated a block diagram of the post normalizing circuit as it is related to the block diagram of FIG. 6.

Thus, the upper and lower input registers, (A register and U register, respectively) are shown using the same reference numerals 97 and 98 as set forth in FIG. 6, since they are in fact, the same registers. The registers 97 and 98 each provide 72 bits to their respective Normalizers 710, 712. It will be shown in FIG. 8 how each of these Normalizers 710, 712 is created from a pair of 36-bit normalizing gates. It should also be noted here that the Post Normalizer 738 used in the present invention is comprised of a single one of these 36-bit normalizing gates.

The basic mode of operation is to provide a normalizing circuit which checks the validity and direction supplied by these "main" Normalizers 710, 712.

The Selector Device 720 provides the selection of the particular shift count to be utilized. This particular shift count 0-6 is sent along line 722 to indicate the particular shift count to be sent to the Shift Count Register 724. The selected shift count is thus contained in the Shift Count Register 724 which magnitude of shift is then applied to the Shift Matrix 730. The A Operand Selector 148 (A OPSEL) (shown and described with reference to FIG. 6) receives the output from the floating-point characteristic logic 728, as well as the output of the Shift Matrix 730. This same output of Shift Matrix 730 is applied to the A Wrap Register 732 previously described.

At the same time the A OP SEL 148 is gated to the Arithmetic Output Register, the Shift Matrix 730 output is gated to the A Wrap Register 732.

The Post Normalizer 738 uses the top 13 bits of the A Wrap Register 732. The 14th input is tied high (1) and the 15th input and all higher inputs is tied low (0). If the shift count generated is non-zero, an error is indicated in the Error Designator 750. Note the Error Designator 750 (ERRDES) is strobed on instructions which perform a normalizing operation and is disabled when the result is zero. In the particular implementation, because of a conflict of usage of the A Wrap Register 132, the floating point divide instructions are not checked, but could normally be included.

Full normalizations using counts generated by the U Normalizer are performed and checked on the single and double load shift count instructions and the single and double load and convert to floating-point. Full normalizations using counts generated by the A Normalizer are performed and checked on the single and double floating add and subtract instructions. A normalize shift of 0 or 1 (using the constant generator path to the Shift Count Register 724) is performed and checked on the single and double precision floating multiply instructions. A count of 3 is used on the floating expand and compress and load instructions.

Figure 8:
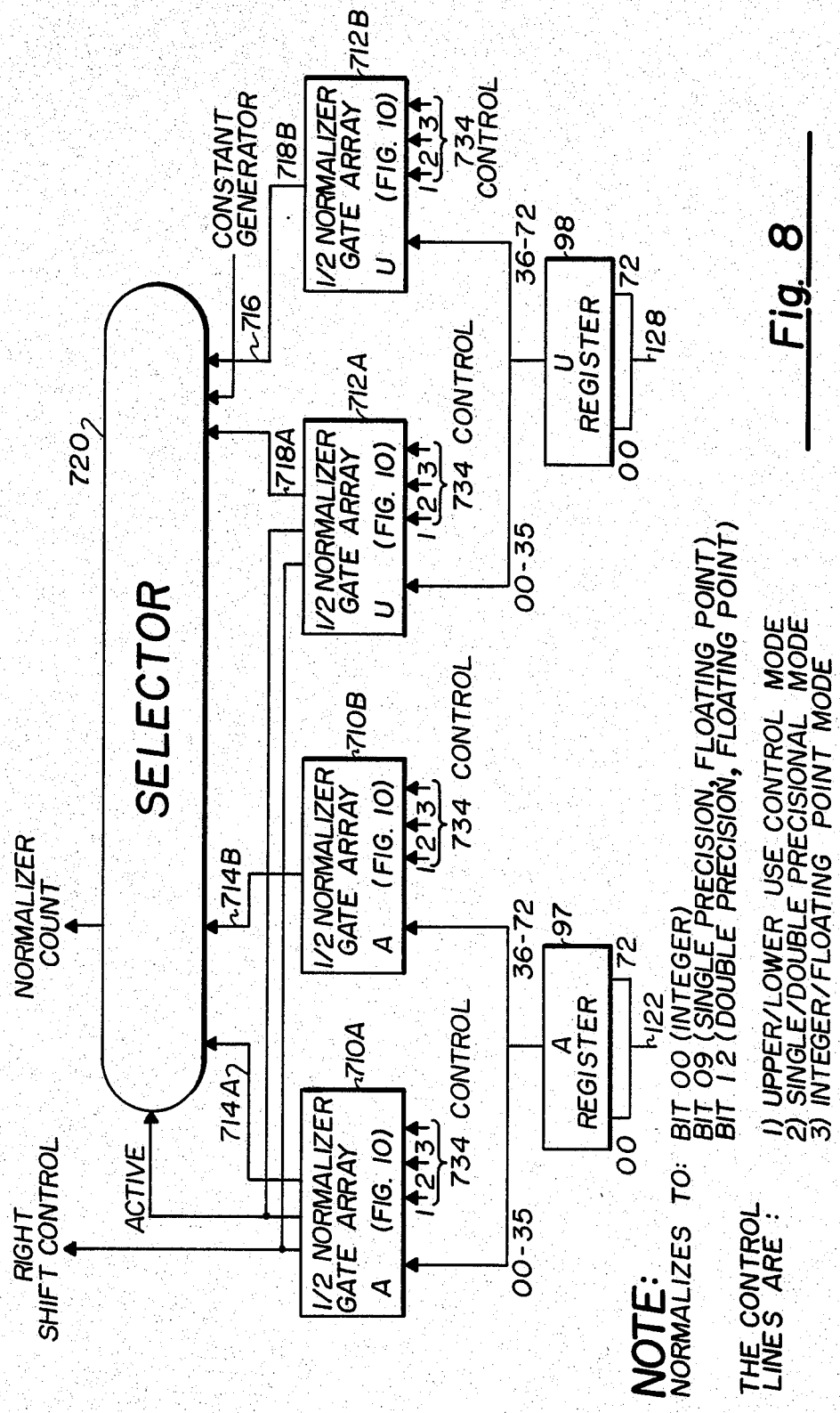
FIG. 8 illustrates a block diagram of the 72-bit A and U normalizers and how they are created from two 36-bit normalizer gate arrays and a selector to provide a 72-bit normalize capability.

The 72 bit U and A Normalizers 710, 712 utilize 2 36 bit Normalizer gate arrays and a selector to provide a 72-bit normalize capability as shown in FIG. 8.

The basic mode of operation is to provide a Normalizer which checks the validity of the count and direction supplied by the "main" Normalizer by using the shifted output of the shift matrix as its input. Since the only bits to which the present preferred system instructions normalize are bits 01, 09, and 12, only 13 bits are needed as data for the check Normalizer. However, any other combination of bits could be used as required by a particular system.

If the "main" Normalizers 710, 712 operated correctly, the post or check Normalizer 738 will determine that its input is normalized (i.e., it will put out a shift count of zero). The error will be detected (i.e. the ERR DES will set) if the check Normalizer outputs a non-zero value at the appropriate time of the particular instructions involved. Special handling of the operand = +0 and unnormalized input cases is necessary to permit utilization of this check mechanism. Either case disables the ERR DES 750 from setting.

Either the U Normalizer 712 or A Normalizer 710 provides shift count and shift control (right, left) to the Shift Count Register. The data is shifted by the Shift Matrix, 730 and combined with the characteristic 728 (if a floating-point operation) in the A Operand Selector 148.

The Post Normalizer, 738 looks at bits 00-12 of the A Wrap Register, 732 and shares the same control lines 2 and 3 with the U and A Normalizers, 712, 710.

The error condition is strobed on the certain predetermined instructions only. The error condition is disabled when a resultant of zero case is detected. This is because an all zero value to the Normalizer will not result in a zero shift count and would generate a false error. For the same reason, the instructions which do not perform a full normalization process must be handled differently than before when unnormalized inputs (which can result in unnormalized outputs) are encountered. Such unnormalized outputs are considered undefined and in this implementation an unnormalized result will be detected as a zero mantissa case and will, therefore, disable the Post Normalizer Error Check through the MANTOSEL. Previous machines have not had an all zero result for unnormalized inputs on the instructions but have put out results consistent with the inputs.

Next, FIG. 8 illustrates the actual implementation of the main Normalizers 710, 712. Since a 72-bit device is utilized, a pair of Normalizer Array Gates 710A and 710B make up the A Normalizer 710 and a second pair 714A and 714B comprise the U Normalizer 714.

It should be repeated here for clarity that the Post or Checking Normalizer 738 is implemented by a single one of these array gates. This is shown in detail in FIG. 10.

FIG. 9 illustrates the detailed implementation of the Error Designator (ERR DES) 750. This is merely a latch circuit 754 and AND gate 752. To provide the proper phasing enabling signals, additional latches 912 and 914 provide the latching signals for phase 02 and phase 03. The program sequences SEQ #1 to SEQ #N provide the program sequences to the OR gate 914 via a plurality of AND gates 916, 918, 920, 922.

Further, FIG. 9 illustrates the detailed configuration of the Error Condition. It is comprised of a 4 Input OR gate 744 which detects if any of the 4 least significant bits of the Post Normalizer output are set (=1) (i.e. that the Post Normalizer 738 is not outputting a zero shift count). It is only necessary to observe the lower 4 bits since the inputs to the Post Normalizer 738 are the top twelve bits of the A Wrap Register 732 followed by a tie high (logical 1) input followed by lows (logical zeroes). Therefore, the maximum count the Post Normalizer can output is 13 decimal in any mode.

On unnormalized instructions, if the instruction would produce unnormalized results, e.g. Floating Point Compress, Floating Point Multiply, Floating Point Expand, the Mantissa 0 Select to Latch 912 will result in the output being forced to zero (0) and will not utilize the Post Normalizer Checker OR gate 744.

Such disabling is provided by separate circuitry and is a detection that the input value to the shift matrix is +0 on an instruction which does a full normalization (e.g. Floating Point add/subtract, load and convert) or has input operands such that they can not be normalized by the limited shifts of particular instructions (e.g. Floating Point multiply or compress or expand). In the case of Floating Point, expand or compress, the input operands to the instruction must be normalized. On the multiply instruction the result of the mantissa multiply must be within one place of being normalized.

Figure 10:
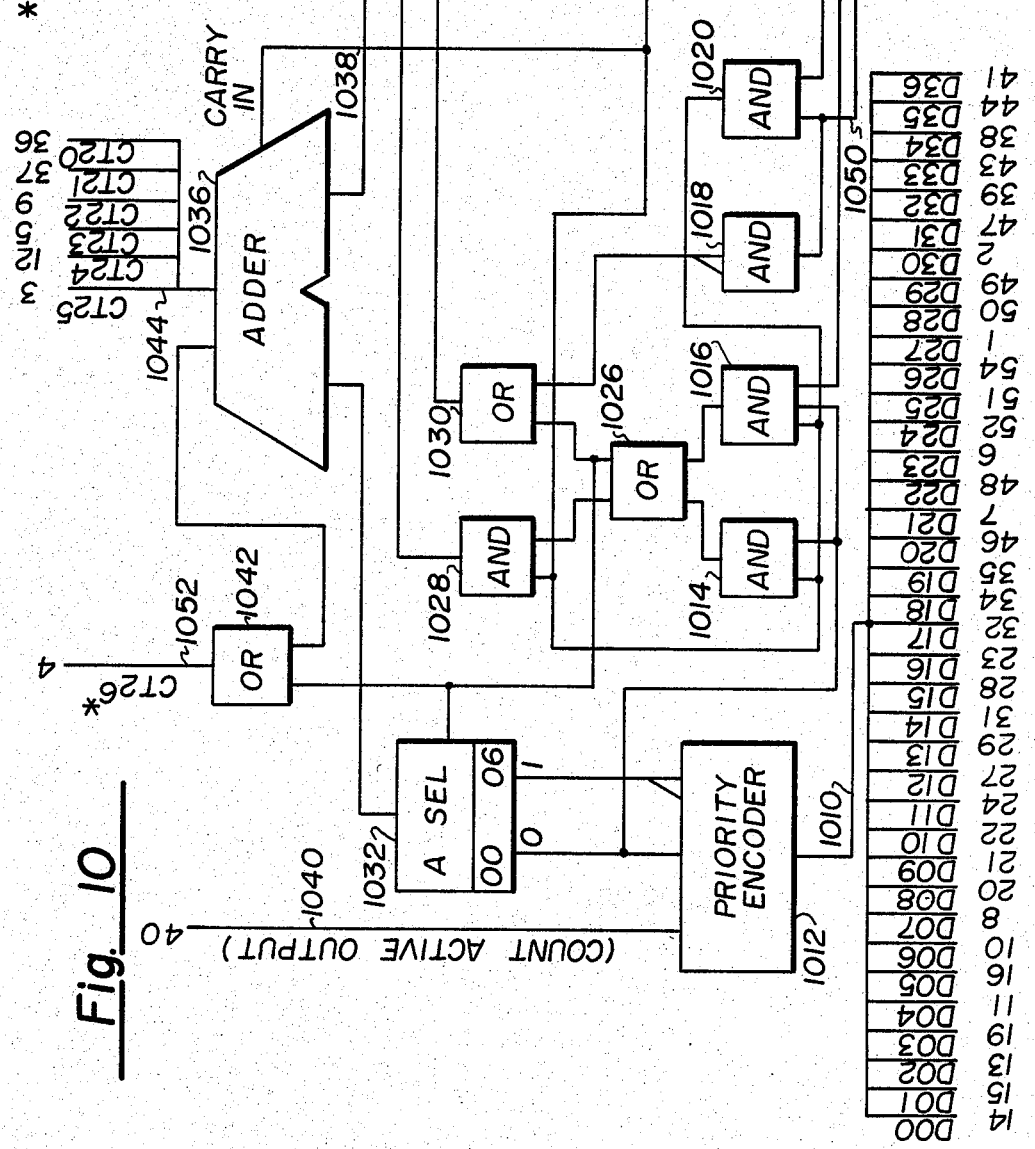
FIG. 10 illustrates the detailed logic, including the pin connections of the normalize count generator gate array as used in the present invention.

Next, refer to FIG. 10 which is a detailed logic diagram of the Normalizer Count Generator. The Normalizer Count Generator is a 37-input (1010) priority encoder 1012 or significance detector which generates a binary count of the priority order or the number of bit positions from an imaginary binary point. Three imaginary binary points are selectable by activating the appropriate mode control lines 1046, 1048, 1050 when the device is used as a significance detector.

It should be pointed out that the partitioning of this device into 36-bit groups renders the implementation by integrated circuitry (chips) quite efficient. Of course, it should be understood that the logic could be implemented with discrete circuit components without departing from the spirit and scope of the invention.

The primary function of this integrated circuit chip is to provide a shaft count needed to normalize arithmetic data. A normalized arithmetic value has the binary point immediately preceding the most significant bit. An imaginary binary point can be defined to be in one of three locations. For single and double precision binary values the binary point is between the first and second bits. For single precision floating-point values the binary point is between the ninth and tenth bits. For double precision floating-point values the binary point is between the twelfth and thirteenth bits.

FIG. 10 shows a block diagram of the Normalizer Count Generator chip. The priority encoder forms a count value equal to the number of positions the most significant active bit is from the second bit. This priority output is then adjusted by the Adder 1036 according to the Mode Control inputs 1046, 1048, 1050. The Mode Control inputs select a constant to be added to the encoder count. This adjusts the count for the location of the binary point and provides for the capability of generating a count value for a 72-bit operand using only two normalizer gate arrays.

Mode Control Input 1EN2

The 1EN2 inputs 1046 specify the word size and the location of the imaginary decimal point. The possible modes of operation are:

| 1EN2 | | MODE OF | BINARY POINT |
| S | R | OPERATION | IS BETWEEN |
| --- | --- | --- | --- |
| 0 | 0 | SINGLE PRECISION | BIT 0 and 1 |
| 0 | 1 | DOUBLE PRECISION | BIT 0 and 1 |
| 1 | 0 | SINGLE PRECISION FLOATING POINT | BIT 9 and 10 |
| 1 | 1 | DOUBLE PRECISION FLOATING POINT | BIT 12 and 13 |

Mode Control Input 2EN2

The 2EN2 input 1050 is used to specify whether the gate array is being used on the upper half or lower half of a 72-bit word. If used on the upper half of a 72-bit word or if used alone on a 36-bit word it is tied high. If used on the lower half it is tied low. When this input is low, the adder 1036 will add 36 to the encoder value if binary double precision is specified, and will add 25 to the encoder value if double precision floating-point is specified. So the lower gate array provides the shift count when the most signiicant active bit is in the lower half word and the upper gate array provides the valid shift count when the most significant active bit is in the upper half word.

Count Active Output

The Count Active Output 1048 is used when joining two gate arrays to obtain the normalize count for a 72-bit word. The count active output becomes an active low whenever 72-bit mode is selected and all the upper 36 inputs are the same level. This condition then causes the selection of the count from the lower order gate array. FIG. 10 is the connection diagram for obtaining the count for a 72-bit word.

Count Outputs

The Count Outputs 1044 are the number of bit positions the most significant active bit is from the imaginary binary point. This is output as a 7-bit value. This count is the number of places the number must be left shifted to normallize it. However, the most significant output count bit is a dual function output. When in floating-point mode the most significant bit indicates the shift direction. If the most significant active input bit is to the left of the imaginary binary point, this output bit becomes an active high. This indicates a right shift is needed to normalize the number.

The arithmetic constant to be used is selected via Constant Selector 1024 and applied to B Selector 1034 which applies its output to the input of the Adder 1036. The AND gates 1028, 1014, 1016, 1018, 1020 and 1022, receive the Mode Inputs 1046, 1048 and 1050 as illustrated in the FIG. 10 and provides the necessary selected shift counts in conjunction with OR gates 1026 and 1030 to the selected inputs received from the Priority Encoder 1012. A first and a second group of six bits are applied to the A and B Selection circuits 1032 and 1034. The outputs of these selection circuits, properly shifted are then applied to the Adder 1036.

In summary, a method and a means for the throughchecking of normalizer data paths has been disclosed. Typically, within the arithmetic section of an IP certain instructions require a normalizing process on either an input operand directly (such as a scale factor shift) or on the result of an operation on floating point numbers (e.g., floating point add) to normalize the mantissa before packing the characteristic. The hardward to accomplish this includes a normalizer module which determines the shift count and direction needed to normalize a 36 or 72-bit operand to a particular bit. The operand is then shifted within a shift matrix by the amount and direction provided in the normalizer module. In previous machines the normalizer module has not been throughchecked. The method described provides a check on the normalizer module operation and also the shift control logic.

Throughchecking of the Normalizer/Constant Generator/Shift Count Register paths is achieved considerably cheaper than by duplication. Previous machines have not checked the normalizer module operation. In this particular implemention, two Normalizer Modules are checked plus the Normalizer to Shift Matrix control designator paths which are not checked otherwise. The Shift Matrix is checked by other means but the Post Normalization method also checks the Shift Matrix itself and the Shift Control Designator to Shift Matrix paths.

Usually, the hardward to accomplish this includes a normalizer module which determines the shift count and direction needed to normalize a 36 or 72-bit operand to a particular bit. The operand is then shifted within a shift matrix by the amount and direction provided in the normalizer module. As previously mentioned, this normalization process has not been throughchecked. That is, no checking was done on the normalization process to determine if it was correctly accomplished.

This implementation checks the operation of a pair (2) of 72-bit normalizers on one 13-bit normalizer. This checking is significant on many instructions of present day computers. For example, single or double load shift and count; single or double floating add/subtract; single and double precision floating multiple; single and double precision floating divide; single and double load and convert floating; floating expand and compress and load operation.

This invention achieves throughchecking of the normalizer, the Constant Generator and the Shift Count Register considerably cheaper than would be possible if we checked each operation by duplication of the circuitry.

From the foregoing detailed description of an embodiment of the novel Post Normalizer Checking means for use in a floating-point data processing system, it can be seen that the various purposes and objectives of the invention have been met. It is of course understood that the detail configuration of a preferred embodiment is not intended to limit the scope of the invention, and what is intended to be protected by Letters Patent as set forth in the appended claims.

What is claimed is:

1. Apparatus for throughchecking the normalizing operations of a main normalizer means of an arithmetic unit means of a data processing system comprising:
   (a) main normalizer means included in said arithmetic unit means;
   (b) arithmetic unit normalized shift matrix output means associated with said arithmetic unit means and said main normalizer means for providing output signals;
   (c) register means coupled to said arithmetic unit normalized shift matrix output means to capture said output signals therefrom;
   (d) post normalizer circuit means coupled to said register means and responsive to captured ones of said output signals for identifying normalization error conditions;
   (e) error detector means coupled to said post normalizer circuit means for detecting error conditions; and
   (f) error designator circuit means having input means and output means, said input means connected to said error detector means to respond to the presence of a detected error and thereby provide a designated error signal at said output means.

2. The apparatus for throughchecking the normalizing operation as set forth in claim 1 wherein both said post normalizer circuit means and said main normalizer means of said arithmetic unit means are of the same circuit type.

3. The apparatus for throughchecking the normalizing operation as set forth in claim 1 wherein said error designator circuit means includes a latching circuit which provides a first and a second output signal to denote an error condition and a non-error condition, respectively.

4. A normalizer throughchecking circuit comprising a post normalizer circuit connected to the main normalizer circuit of an arithmetic unit of a data processing system; shift/nonshift indicating means for indicating a shift or a non-shift condition of said post normalizer circuit connected to said post normalizer circuit; and error/non-error indicating means connected to said shift/nonshift indicating means for indicating an error signal when a shift is indicated and a non-error signal when a non-shift is indicated.

5. The normalizer throughchecking circuit of claim 4 wherein said post normalizer circuit is a second normalizer circuit corresponding in configuration to said main normalizer circuit.

6. The normalizer throughchecking circuit of claim 4 wherein said shift/nonshift indicating means for indicating a shift or non-shift condition is an OR gate.

7. The normalizer throughchecking circuit of claim 4 wherein said error/non-error indicating means includes a bistable device capable of indicating an error signal in one stable condition and a non-error signal in the opposite stable condition.

8. The normalizer throughchecking circuit of claim 7 wherein said bistable device includes a further input means for disabling/enabling said device when predetermined instructions indicate that the output of said bistable device would be erroneous.

9. The normalizer throughchecking circuit of claim 8 wherein said bistable device is a latch circuit.

10. The normalizer throughchecking circuit of claim 7 wherein said error/non-error indicating means further includes an AND gate connected as an input to said error/non-error indicating means.

11. A method of throughchecking the normalizer paths of an arithmetic unit of a data processing system comprising the steps of:
(a) applying the shifted output from a shift matrix to a further normalizer to check that the count and the direction supplied by main normalizer of the arithmetic unit has been accomplished, and to provide a first output;
(b) applying the first output of the further normalizer to an error detecting means to provide a second output to indicate an error if the shift has not been accomplished; and
(c) applying the second output of the error detecting means to an error designator means to activate said error designator means when the shift directed to be accomplished is not equal to the shift actually accomplished.

12. The method as set forth in claim 11 including separate further circuitry means for disabling of the error detection circuitry where the separate further circuitry detects that the number being shifted is $\pm 0$ or cannot be normalized by an instruction doing a limited shift rather than a full normalization.

13. The method as set forth in claim 12 where the instruction doing the limited shift is a floating-point multiply, divide, compression or expansion.

* * * * *